(12) United States Patent
Delattre et al.

(10) Patent No.: US 9,137,264 B2
(45) Date of Patent: Sep. 15, 2015

(54) METHOD FOR OPTIMIZING THE TRANSFER OF A STREAM OF SECURE DATA VIA AN AUTONOMIC NETWORK

(75) Inventors: Michel Delattre, Boulogne-Billancourt (FR); Jacques Provost, Savigny-sur-Orges (FR)

(73) Assignee: IPANEMA TECHNOLOGIES, Fontenay-Aux-Roses (FR)

( * ) Notice: Subject to any disclaimer, the term of this patent is extended or adjusted under 35 U.S.C. 154(b) by 191 days.

(21) Appl. No.: 13/878,797

(22) PCT Filed: Oct. 18, 2011

(86) PCT No.: PCT/EP2011/068185
§ 371 (c)(1),
(2), (4) Date: Jun. 21, 2013

(87) PCT Pub. No.: WO2012/052434
PCT Pub. Date: Apr. 26, 2012

(65) Prior Publication Data
US 2013/0268995 A1 Oct. 10, 2013

(30) Foreign Application Priority Data
Oct. 21, 2010 (FR) ...................... 10 58621

(51) Int. Cl.
*H04L 29/06* (2006.01)
(52) U.S. Cl.
CPC ............ *H04L 63/20* (2013.01); *H04L 63/0464* (2013.01); *H04L 63/0884* (2013.01); *H04L 63/166* (2013.01)
(58) Field of Classification Search
CPC . H04L 63/20; H04L 63/0464; H04L 63/0884; H04L 63/166
See application file for complete search history.

(56) References Cited

U.S. PATENT DOCUMENTS

| 6,367,009 | B1 * | 4/2002 | Davis et al. | 713/166 |
| 7,289,632 | B2 * | 10/2007 | Buer | 380/278 |
| 8,214,635 | B2 * | 7/2012 | Wang et al. | 713/156 |
| 8,700,892 | B2 * | 4/2014 | Bollay et al. | 713/153 |
| 8,707,043 | B2 * | 4/2014 | Wason et al. | 713/171 |
| 2007/0074282 | A1 | 3/2007 | Black et al. | |
| 2008/0126794 | A1 * | 5/2008 | Wang et al. | 713/151 |
| 2009/0178109 | A1 | 7/2009 | Nice et al. | |

OTHER PUBLICATIONS

Dijiang Huang, et al.; "MobiCloud: Building Secure Cloud Framework for Mobile Computing and Communication"; 2010 Fifth IEEE International Symposium on Service Oriented System Engineering; Jun. 4, 2010.
International Search Report for PCT/EP2011/068185 dated Jan. 17, 2012.

* cited by examiner

*Primary Examiner* — Jeffrey Pwu
*Assistant Examiner* — William Corum, Jr.
(74) *Attorney, Agent, or Firm* — Pearne & Gordon LLP

(57) ABSTRACT

The invention relates to a method for optimizing the transfer of secure data streams via an autonomic network between multiple information-producing users Pi and multiple information-consuming users Cj, in which, for each secure session between an information-producing user Pi and an information-consuming user Cj, non-persistent security settings are exchanged between an optimization module and an autonomic agent via a secure control channel to apply between the autonomic agent and the optimization module the previously negotiated security procedure, such that during an exchange of streams between the information-producing user Pi and the information-consuming user Cj, the optimization module having non-persistent security settings appears as a client for a server during the said session.

10 Claims, 4 Drawing Sheets

METHOD FOR OPTIMIZING THE TRANSFER OF A STREAM OF SECURE DATA VIA AN AUTONOMIC NETWORK

TECHNICAL FIELD

The invention is in the telecommunications field and relates more specifically to a method for optimising the transfer of streams of secure data via an autonomic network between multiple information-producing users Pi and multiple information-consuming users Cj, where each includes at least one client and/or at least one server, where the said autonomic network includes at least one central element responsible for distributing instructions for optimising the transfer of streams of data, at least one observation module responsible for measuring the characteristics of the streams to be transferred, and at least one optimisation module responsible for applying the instructions distributed by the central element for optimising the transfer taking into consideration the measurements obtained by the observation module, where the clients and the servers are configured to exchange mutual authentication settings and security settings of the streams exchanged between the information-producing users Pi and information-consuming users Cj, and for checking the integrity of the exchanges and implementing protection of confidentiality according to the said security settings and according to the said authentication settings.

The invention also relates to a device intended to implement the method according to the invention.

The invention also relates to a computer program recorded on a recording medium, containing instructions to implement the method according to the invention when it is executed by computer.

STATE OF THE PRIOR ART

With the latest developments of telecommunications networks, servers are no longer located in well identified perimeters of the Company or of the group of users, but are distributed around an extended WAN (Wide Area Network). As a consequence, security systems which authenticate the functions participating in the exchanges of data streams, the integrity of these streams and the confidentiality of these streams may no longer be based only on perimeter protection principles. Fraudulent use of identity, which is one of the main threats of this process of increasing distribution, enables fraudulent acts to be committed, or access to be gained inappropriately to rights. One of the most widespread techniques for fraudulent use of identity is phishing, which consists in making an information consumer or producer believe that they are in contact with a trusted third party.

It is consequently essential to guarantee the integrity of the exchanged data streams, and the authenticity of the participants in these exchanges.

Another technical problem inherent to WAN networks arises from the fact that their characteristics distort the streams significantly and cause great loss of quality of Experience of the networked applications.

Consequently, systems for optimising the streams must be introduced into the chain of trust, without however allowing exposure to threats of fraudulent use.

IPsec (Internet Protocol Security), defined by IETF, is a set of protocols using algorithms allowing secure data to be conveyed over an IP network. According to these protocols, before an IPsec transmission may be accomplished authentication mechanisms at both ends of a secure tunnel must be implemented. These mechanisms form part of a very static security architecture appropriate for the base infrastructures to accomplish the masking of streams with a high degree of confidentiality. This requires that security associations are planned, and that there is logic wiring above an open network in packet mode. The optimisation systems are then placed upstream from this logic wiring, and form an integral part of the zone of trust in which the applications are deployed. These systems may still be coordinated within the area, either by rules, or by autonomic mechanisms. This coordination enables optimisation capacities, for example redundant data dictionaries, to be pooled. This pooling substantially increases the effectiveness of these systems.

However, flexibility, roaming, and continuity of service in the event of outages or crises lead to the logic wiring being released above the network. Simultaneously, the growing threat of corrupted elements within the secure network requires more refined access control. This leads to the more widespread use of Client-Server mode protocols which dynamically create secure tunnels which can generally only convey an application stream. Thus, the TLS (Transport Layer Security) Internet exchange security protocol, previously called Secure Sockets Layer (SSL), and its extensions such as DTLS, which is dedicated to the UDP datagram, rely on digital certificates enabling the server to be authenticated, and even strong authentication of the client. Optimisation systems are then merely functions integrated into applications, and it becomes difficult to coordinate the multiple applications and the multiple users interacting with the WAN network. The effectiveness achieved with the optimisation systems disseminated in the WAN network or with these forms of access is then lost.

TLS protocol has been widely adopted in application optimisation systems installed inside the perimeters of data centres. This success has required a search for solutions to accelerate cryptographic processing (SSL offload). Systems which are separate from the servers have been introduced and dedicated to SSL processing. Their centralisation and co-location with the application servers has made possible simple duplication of the digital certificates used as the basis for the authentication. These certificates are signed by a Certification Authority which declares that the association between the public key and the identity of the server is valid. Procedures such as those designed by the RSA laboratories (PKCS Public Key Cryptographic Standards) are widely adopted. Generally, before issuing a certification request to the Certification Authority, a public key-private key pair is issued and the private key is protected. Pooled administration of servers and of optimisation systems means that, for a given signed certificate, there may be several facilities where the associated private key is installed. A first generation of application optimisation systems has inherited these principles, particularly since it used single-point optimisation principles.

However, maximum effectiveness of an optimisation can be accomplished only by deploying systems at both ends of a secure tunnel.

US document 2007/0074282 "Distributed SSL processing" describes a method for terminating an SSL session in a first optimisation system placed as close as possible to the client, whilst leaving an SSL certificate manager in the data centre. These optimisation systems form part of a secure infrastructure in which the optimised streams may be exchanged without any fear of diversion.

However, this method forms part of an architecture in which the optimisation systems form part of the Company's logic wiring, and is no longer appropriate for the new challenges of flexibility, roaming, continuity of service, growing threats of corrupted elements upstream from the WAN network and multi-party diagrams in which the responsibilities of telecommunications operators, service providers and company organisations are combined.

FIG. 1 illustrates schematically a client-server architecture implementing a security procedure of the prior art.

This architecture includes a data centre 2 hosting several application servers 4, a first process-acceleration module 6, and an exchange security module 8. Data centre 2 is connected via a WAN network 9 to a remote location 10 including several clients 12 and a second process-acceleration module 14.

First process-acceleration module 6 and exchange security module 8 collaborate within a common administration. Exchange security module 8 holds the private keys required for authenticating servers 4. It sends process-acceleration module 6 the cryptographic elements relating to a temporary Client-Server session enabling the streams to be decrypted. In its turn process-acceleration module 6 sends these cryptographic elements to data centre 2 in order to decrypt the streams of one session and optimise them before encrypting them once again.

In this architecture modules 4, 6, and 8 are in secure perimeter 2 of data centre 2 and are administered in a centralised manner.

To summarise, the techniques of the prior art require:
either that the optimisation servers and the devices are associated within the service provider's perimeter of trust, and that compatible optimisation systems are placed as close as possible to the clients,
or that the optimisation systems of a perimeter of the Company's data centre are authorised to represent themselves to the Company's clients as the "Cloud Computing" servers.

However, if there are several service providers, introducing optimisation systems on the Client sites which are compatible with those of the service providers encounter implementation difficulties which are of the same kind as those found when implementing secure services within mobile platforms (mobile telephones and smartphones). One solution proposed in this connection consists in partitioning the environments of different service providers in a single hardware platform. This solution requires enhanced standardisation of these platforms and of their security architecture, with heavy engagement of the mobile operators. A key element of these architectures is the SIM card, which is the trusted element recognised by all. This also requires a certain standardisation of the exchanges between optimisation systems, in order that the systems of the Client sites are not penalised.

In addition, allowing the systems of the data centre to represent themselves as the "Cloud Computing" servers substantially reduces the advantage of "Cloud Computing" for roaming clients, since the exchanges are not forced to pass through required gateways which are not necessarily on optimum pathways.

One alternative would be for the data centres to be inside the perimeter of a telecommunications operator operating both the optimisation systems of the Clients and Data Centre sites, and also having agreements with the service providers.

In both cases, operations relating to the installation of a reliable authentication procedure are rendered substantially more complex due to the fact that there are multiple agents.

One aim of the invention is to compensate for the insufficiencies of the prior art described above.

Another aim of the invention is to allow secure services of the "Cloud Computing" type to be deployed, whilst leaving the authentication procedure unchanged between the Client and the Server.

DESCRIPTION OF THE INVENTION

The invention thus recommends a method for optimising the transfer of a stream of secure data via an autonomic network between multiple information-producing users Pi and multiple information-consuming users Cj, where each includes at least one client and/or at least one server, in which the said autonomic network includes at least one central element responsible for distributing instructions for optimising the said transfer, at least one observation module responsible for measuring the characteristics of the streams to be transferred, and at least one optimisation module responsible for applying the said optimisation instructions, taking into consideration the measurements obtained by the observation module, and in which the clients and the servers are configured to exchange mutual authentication settings and security settings of the streams exchanged between the information-producing users Pi and the information-consuming users Cj and, after this negotiation, for checking the integrity of the transferred streams, and implementing protection of confidentiality according to the said negotiated security settings.

The method according to the invention includes the following steps:
for each secure session between an information-producing user Pi user and an information-consuming user Cj:
a) detecting by means of an optimisation module located geographically as close as possible to a server the initialisation of a secure session between a client and a server,
b) introducing a wait period during the negotiation between the client and the server within the said optimisation module,
c) establishing during the said wait period a secure control channel between the said optimisation module and an autonomic agent associated with the client,
d) exchanging non-persistent security settings between the said optimisation module and the said autonomic agent via the said secure control channel,
e) applying between the autonomic agent and the optimisation module a security procedure using the said non-persistent security settings, such that during an exchange of streams between the information-producing user and the information-consuming user Cj the optimisation module having non-persistent security settings appears as the client to the server during the said session.

According to one characteristic of the invention, a client may be a proxy acting on behalf of a set of Clients.

The said clients preferentially communicate directly with the core of the autonomic network via a dedicated control channel.

In a particular embodiment of the method according to the invention, the mutual authentication between the client and the server is accomplished by the Internet Key Exchange (IKE) method when the streams are secured by the IPsec protocols, or by the method of exchange of digital certificates when the streams are secured by the protocols of the Secure Sockets Layer (SSL) or Transport Layer Security (TLS) types.

The method according to the invention is implemented by a system for optimising the transfer of streams of secure data exchanged via an autonomic network between multiple information-producing users Pi and multiple information-consuming users Cj, where each includes at least one client and/or at least one server configured to negotiate mutual authentication settings and security settings of the streams exchanged between the information-producing users Pi and the information-consuming users Cj and, after this negotiation, to check the integrity of the exchanges, and to implement protection of the confidentiality of the mutual authentication settings and of the said security settings of the streams, where the said autonomic network includes at least one central element responsible for distributing instructions for optimising the said transfer, at least one observation module responsible for measuring the characteristics of the streams to be optimised, and at least one optimisation module responsible for applying the said optimisation instructions, taking into account the measurements obtained by the observation module.

According to the invention, the said optimisation module includes means to detect the initialisation of a secure session between the client and the server, means to introduce a wait period during the negotiation between the client and the server, means to establish, during the said wait period, a secure control channel with an autonomic agent integrated in the client to exchange between the said optimisation module and the said autonomic agent non-persistent security settings, means to apply between the autonomic agent and the optimisation module a security procedure using the said non-persistent security settings, such that, during an exchange of streams between the information-producing user Pi and the information-consuming user Cj, the optimisation module having the non-persistent security settings appears as the client for the server during the said session.

BRIEF DESCRIPTION OF THE ILLUSTRATIONS

Other characteristics and advantages of the invention will become clear from the following description, which is given as a non-restrictive example, with reference to the appended figures, in which:

previously described FIG. 1 illustrates schematically a client-server architecture implementing a security procedure of the prior art;

DETAILED ACCOUNT OF PARTICULAR EMBODIMENTS

The invention will be described with reference to FIGS. 2 to 5, in which identical references designates elements implementing identical functions.

Figure 1:
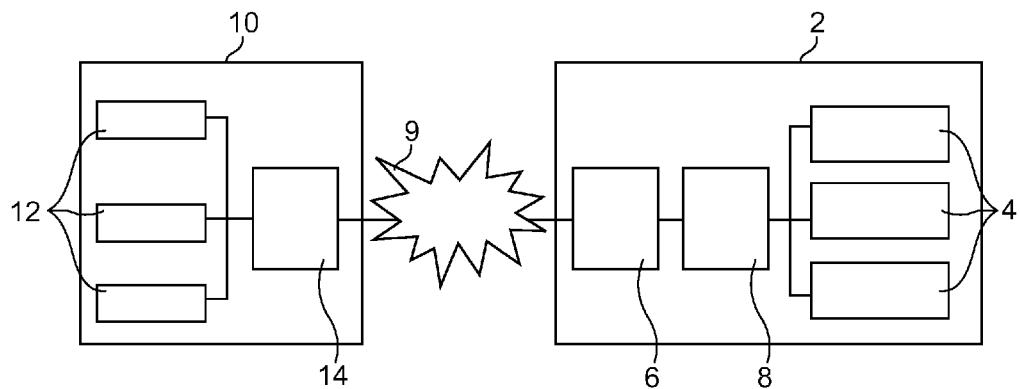
Figure 2:
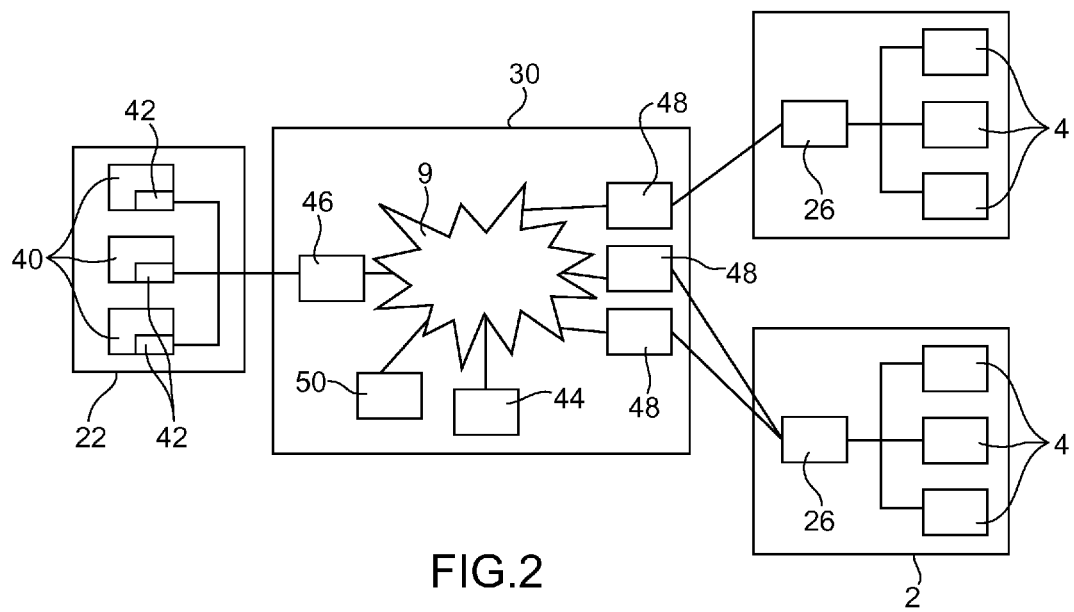
FIG. 2 illustrates schematically a client-server architecture implementing a security procedure according to the invention in an autonomic network.

FIG. 2 illustrates schematically a client-server architecture including a first secure area 20, hosting application servers 4 and a process-acceleration module 6. First secure area 20 is connected via an autonomic network 30 to a second secure area 22 such as, for example, a company or a department including clients 40 each of which integrates an autonomic agent 42.

Autonomic network 30 includes a central element 44 responsible for distributing instructions for optimising the data transfer between first secure area 20 and second secure area 22, an observation module 46 responsible for measuring the characteristics of the streams to be transferred, an optimisation module 48 responsible for applying the said optimisation instructions, taking into consideration the measurements obtained by observation module 46, and a coordination module 50, intended to apply the instructions imposed by central element 44, with the aim of authorising or prohibiting the transfer of the security settings and authentication settings previously negotiated between clients 40 and application servers 4.

In operation, when a secure session is initiated between one of autonomic agents 42 and one of servers 4, the start of this session is automatically detected by one of optimisation modules 48. The latter offers its services to autonomic agent 42, which had exchanged identification data with coordination module 50, in order to make itself known to network 30. As an example, this detection occurs on recognising the message HELLO SERVER of the SSL protocol issued by the client towards the server, and the IP address of the client forming part of the identification data previously supplied by autonomic agent 42 in the core of the autonomic network, which is known to optimisation module 48. Optimisation module 48 waits for the negotiation between client 40 and server 4 and, during the wait period, establishes a secure communication channel with autonomic agent 42. Using this secure communication channel, optimisation module 48 offers to autonomic agent 42 to optimise the transfer of the secure stream, and to insert itself in the chain of trust using various methods.

A first method consists in letting client 40 continue to negotiate the security settings with applications server 4, and to collect the negotiated security settings using the secure communication channel in order that the secure stream between client 40 and server 4 may be processed in a manner which is transparent for server 4.

Another method consists in modifying, from optimisation module 48, the negotiation exchanges between client 40 and server 4, and in dynamically generating authentication settings for client 40. During the period of the secure session optimisation module 48 then represents itself as server 4 with client 40, and as client 40 with server 4.

The negotiated security procedure is then applied between autonomic agent 42 and optimisation module 48 such that during an exchange of streams between client 40 and server 4, optimisation module 48 appears as client 40 for server 4 during the said session.

As an example, the security procedure consists in applying the SSL processes such as:

Numbering and signing each data packet transmitted from client 40 and optimised by the autonomic agent, Encrypting with the negotiated algorithm, and using the negotiated settings for configuring this algorithm, the content of the data packets transmitted from client 40, Decrypting with the negotiated algorithm the content of the data packets intercepted by optimisation module 48, Renumbering and signing each data packet retransmitted from optimisation module 48 to server 4 using the same methods as those used by client 40, Encrypting with the same negotiated algorithm, and using the same negotiated settings for configuring this algorithm, the content of the data packets retransmitted from optimisation module 48 towards server 4, Processing the data packets received at server 4 as though they came directly from client 40.

It should be noted that in a preferred embodiment of the method according to the invention the transfer of autonomic agent 42 to optimisation module 48 of the security settings negotiated between client 40 and server 4 is subject to authorisation by a coordination module 50, which is configured to apply instructions imposed by central element 44.

In a second embodiment of the method according to the invention, the said transfer is subject to rules defined by the administrator of client 40 which consist either in not optimising certain particular streams, or in recording in a log the secure session which has been optimised, or again in notifying an alert to the user of client 40, informing them that the secure session they are using has been optimised. The administrator of client 40 is, for example, the data manager of a Company. This Company can rely on the services of a Telecommunications Operator to transfer optimally its streams between its Users, and between its Users and servers of a service provider. Known examples of service providers for companies are GOOGLE APPS® and MICROSOFT BPOS® (Business Productivity On line Suite. A trust relationship binds the Company and the service provider, and this relationship is based on mutual authentication of the servers of the service provider and of the Users of the Company. Another trust relationship binds the Company and the Telecommunications Operator and is based on a service contract. Optimisation of the transfer of secure streams requires that the elements managed by the Telecommunications Operator are inserted, stream-by-stream, in the chain of trust between the Company's Users and the Service Providers. The said transfer is therefore subject to rules allowing a high degree of trust to be guaranteed, and means of verification to be provided.

Coordination modules 50 are also configured to organise a transfer of the optimisation functions between two separate optimisation modules 48, when the secure streams change route.

Figure 3:
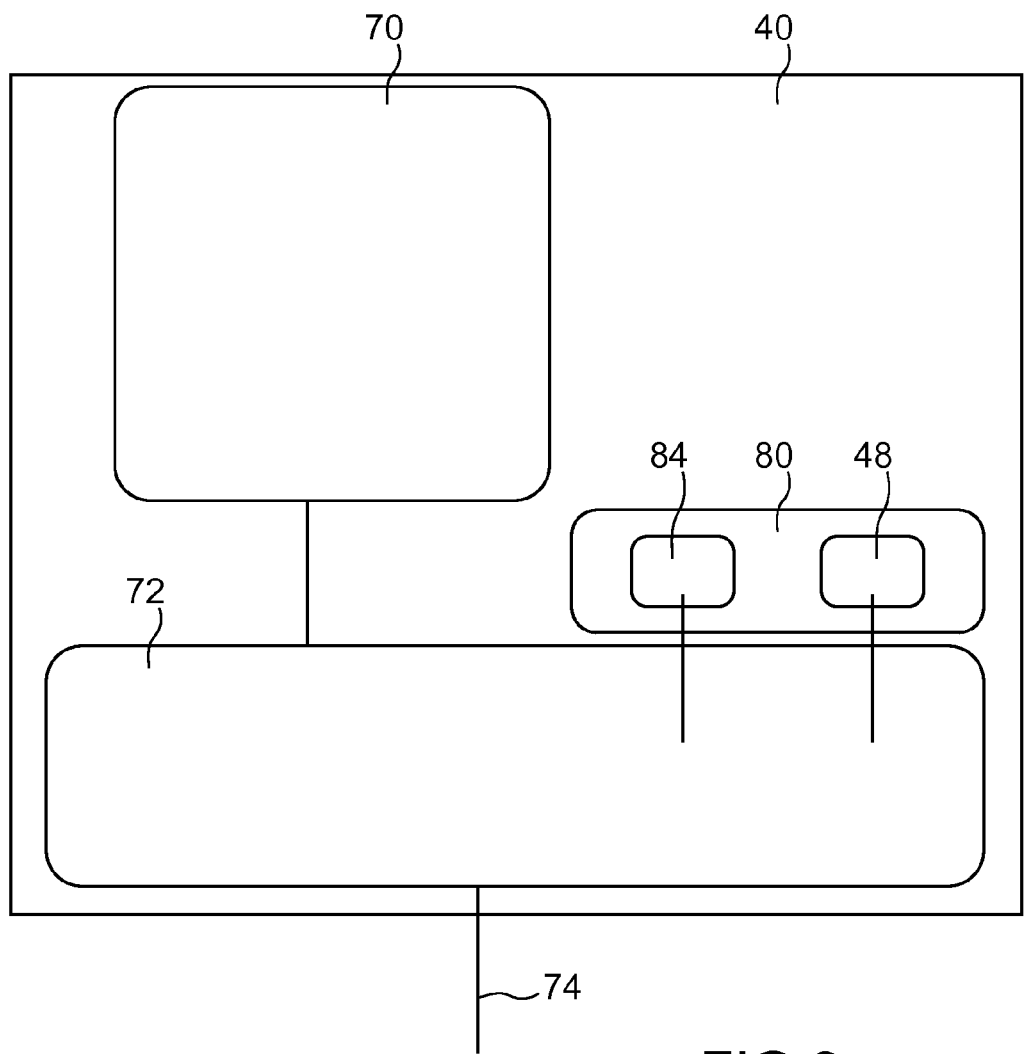
FIG. 3 illustrates schematically an example of a client integrating an autonomic agent implementing a security procedure according to the invention.

FIG. 3 represents an example of a client 40 consisting of applications 70 and of an operating system 72, which is connected to the network via a network interface 74. This client 40 includes an autonomic agent 80 including an optimisation module 48 and a cryptographic module 84.

Cryptographic module 84 can, as an example, behave with regard to operating system 72 as a Smartcard or an SSL acceleration card. As a result, it accesses the sessions' cryptographic elements without, however, holding the private keys of the digital certificates and the certificates of the certification authorities.

Figure 4:
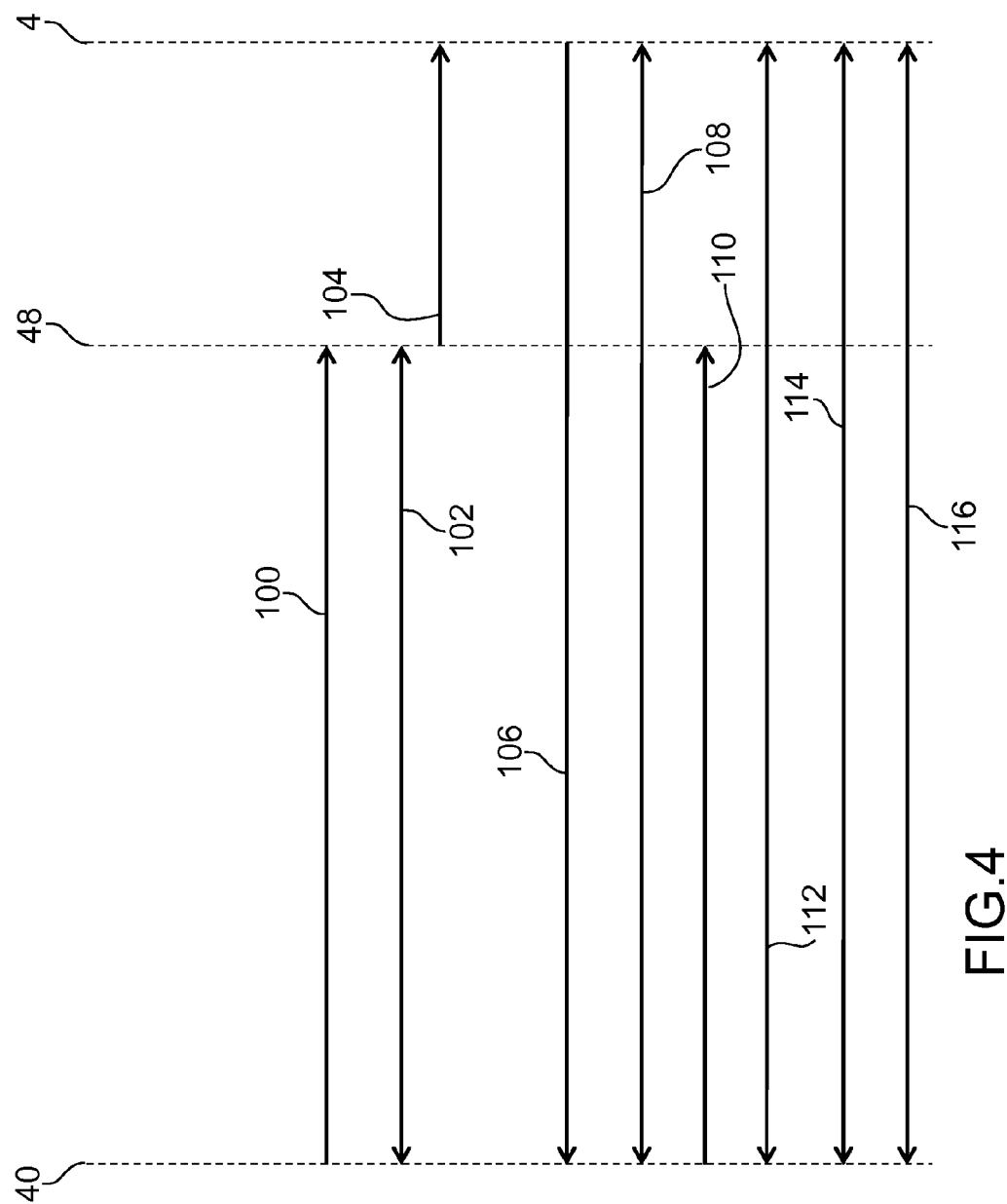
FIG. 4 illustrates the exchanges between a client, an optimisation module and a server in a first embodiment of the method according to the invention.

FIG. 4 illustrates a first embodiment of the method according to the invention, in which each data packet retransmitted from optimisation module 48 towards server 4 is renumbered and signed using the same methods used by client 40.

With reference to FIG. 4, in step 100, a client 40 sends server 4 a message HELLO SERVER of the SSL protocol. This message is intercepted by an optimisation module 48 which is as close as possible to the server. While this message is being processed by optimisation module 48, an Automatic Control Handshake procedure is initiated between client 40 and optimisation module 48 via a secure channel (step 102).

In step 104 optimisation module 48 transmits the intercepted message HELLO SERVER to server 4.

In step 106 server 4 returns to client 40 a HELLO SERVER message including the authentication certificate of server 4.

In step 108 a procedure to negotiate security settings is initiated between client 40 and server 4.

In step 110, client 40 sends optimisation module 48 the security settings negotiated in step 108 with server 4.

In step 112 client 40 and server 4 exchange an SSL end-of-negotiation procedure signal.

In step 114 client 40 and server 4 exchange data which is processed on-the-fly by optimisation module 48, which is in possession of the session's security settings received in step 110.

When all the data has been exchanged client 40 and server 4 exchange an end-of-communication signal in step 116.

Figure 5:
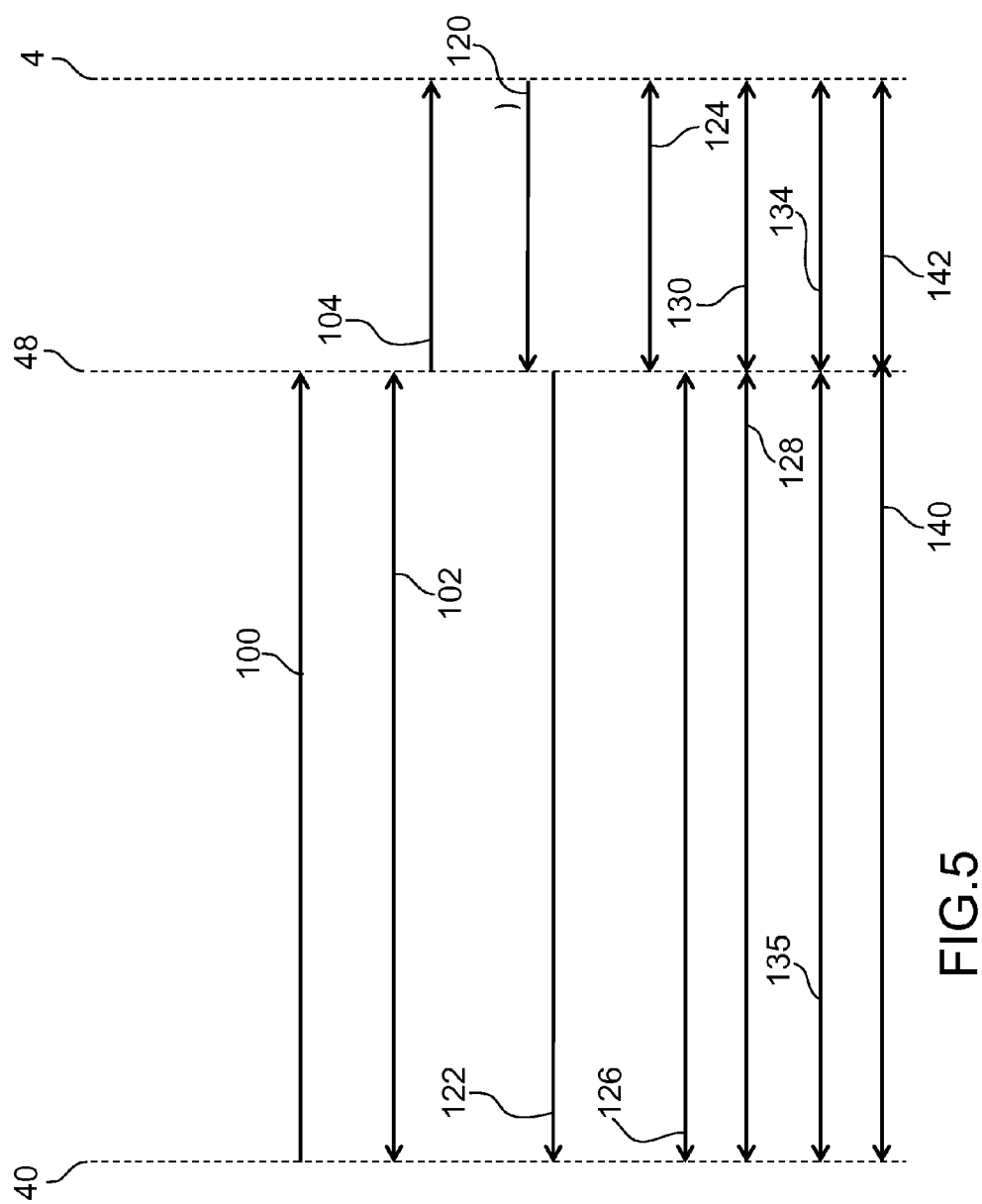
FIG. 5 illustrates the exchanges between a client, an optimisation module and a server in a second embodiment of the method according to the invention.

FIG. 5 illustrates a second embodiment of the method according to the invention, in which the content of the data packets retransmitted from optimisation module 48 towards server 4 is encrypted with the algorithm and using the configuration settings of this algorithm negotiated between optimisation module 48 which represents itself as client 40 and server 4.

In this embodiment steps 100, 102 and 104 are identical to the step of FIG. 4.

In step 120 server 4 returns to optimisation module 48 a HELLO SERVER message including the authentication certificate of server 4.

In step 122 optimisation module 48 sends a HELLO SERVER message to client 40, using the data of the server's authentication certificate, and initialisation data acquired during the handshake of step 102.

In step 124 a procedure to negotiate security settings is initiated between optimisation module 48, which represents itself as client 40 and server 4.

In step 126 a procedure to negotiate security settings is initiated between client 40 and optimisation module 48, which represents itself as server 4 in accordance with the handshake of step 102.

In step 128, client 40 and optimisation module 48 exchange an end-of-handshake procedure signal.

In step 130 server 4 and optimisation module 48 exchange an end-of-handshake procedure signal.

In step 132 client 40 and optimisation module 48 exchange data.

In step 134 optimisation module 48 and server 4 exchange the said data.

When all the data has been exchanged client 40 and optimisation module 48 exchange an end-of-communication signal in step 140.

Similarly, in step 142 optimisation module 48 exchanges an end-of-communication signal with server 4.

As an example, optimisation module 48 may be a cryptographic service provider which inserts itself in the security architecture of Client 40, and the action of which is strictly defined by the administrator of Client 40.

The method according to the invention applies in order to optimise secure data streams generated by multimedia communication applications, such as telephony, videophony, videoconferencing, or multimedia distribution applications such as video-on-demand, broadcasts, content syndications, or consultation applications such as directories, interactive services, or again information-sharing applications such as Peer-to-Peer exchanges, distributed databases, or computer applications the elements of which are executed on remote machines and which are synchronised with one another to exchange data across the autonomic network.

The invention claimed is:

1. A method for guaranteeing an integrity of exchanged data streams and an authenticity of participants in said data exchange in an autonomic network (30) between multiple information-producing users Pi and multiple information-consuming users Cj, where each includes at least one client (40) and/or at least one server (4), a method in which the said autonomic network includes at least one central element (44) responsible for distributing instructions for optimizing said transfer, at least one observation module (46) responsible for measuring the characteristics of the streams to be transferred, and at least one optimization module (48) geographically located in a zone of trust in which applications are deployed, said optimization module (48) responsible for applying the said optimization instructions, taking into consideration the measurements obtained by the observation module (46), and in which the clients (40) and the servers (4) are configured to exchange mutual authentication settings and security settings of the streams exchanged between the information-producing users Pi and the information-consuming users Cj and, after this negotiation, for checking the integrity of the transferred streams, and implementing protection of confidentiality according to the said security settings and according to the said authentication settings, a method characterized in that it includes the following steps:

for each secure session between an information-producing user Pi user and an information-consuming user Cj:
a) detecting the initialization of a secure session between a client (40) and a server (4) by means of the optimization module (48),
b) introducing a wait period during the negotiation between the client (40) and the server (4) within said optimization module (48),
c) establishing during said wait period a secure control channel between said optimization module (48) and an autonomic agent (42) associated with the client (40),
d) exchanging non-persistent security settings between said optimization module (48) and the said autonomic agent (42) via the said secure control channel,
e) applying between the autonomic agent (42) and the optimization module (48) a security procedure initialized by the said non-persistent security settings, such that during an exchange of streams between the information-producing user Pi and the information-consuming user Cj the optimization module having non-persistent security settings appears as the client to the server during the said session, and
f) transferring the optimization instructions between two separate optimization modules when the secure streams change route.

2. A method according to claim 1 in which the transfer of the autonomic agent (42) to the optimization module (48) of the security settings and of the authentication settings negotiated between the client (40) and the server (4) is subject to an authorization of a coordination module (50) intended to apply instructions imposed by the central element (44) with the aim of authorizing or prohibiting said transfer.

3. A method according to claim 1 in which the transfer of the autonomic agent (42) to the optimization module (48) of the security settings and of the authentication settings negotiated between the client (40) and the server (4) is subject to at least one rule previously defined by the administrator of the client (40).

4. A method according to claim 3 in which the said rule consists either in not optimizing certain particular streams, or in recording the secure session which is subject to an optimization in a log, or in notifying an alert to the user of the client (40) informing him that the secure session which he is using has been optimized.

5. A method according to claim 1 in which the client (4) communicates directly with the core of the autonomic network via a dedicated control channel.

6. A method according to claim 1 in which the streams of secure data exchanged between an information-producing user Pi and an information-consuming user Cj are generated by multimedia communication applications, including telephony, videophony, videoconferencing, or multimedia distribution applications including video-on-demand, broadcasts, content syndications, or consultation applications including directories, interactive services, or information-sharing applications including Peer-to-Peer exchanges, distributed databases, or computer applications the elements of which are executed on remote machines and which are synchronized with one another to exchange data across the autonomic network.

7. A method according to claim 1 in which the mutual authentication between the client (40) and the server (4) is based on the Internet Key Exchange (IKE) method when the streams are secured by the IPsec protocols, or on the method of exchange of digital certificates when the streams are secured by the protocols of the Secure Sockets Layer (SSL) or Transport Layer Security (TLS) types.

8. A method according to claim 7 in which the client (40) is a proxy acting on behalf of a set of Clients.

9. A system for guaranteeing an integrity of exchanged data streams and an authenticity of participants in said data exchange in an autonomic network (30) between multiple information-producing users Pi and multiple information-consuming users Cj, where each includes at least one client (40) and/or at least one server (4) configured to negotiate mutual authentication settings and security settings of the streams exchanged between the information-producing users Pi and the information-consuming users Cj and, after this negotiation, to check the integrity of the exchanges, and to implement protection of the confidentiality according to the said security settings of the streams, where the said autonomic network (30) includes at least one central element (44) responsible for distributing instructions for optimizing said transfer, at least one observation module (46) responsible for measuring the characteristics of the streams to be optimized, and at least one optimization module (48) geographically located in a zone of trust in which applications are deployed, said optimization module (48) being responsible for applying said optimization instructions, taking into account the measurements obtained by the observation module (46), a system characterized in that said optimization module (48) includes means to detect the initialization of a secure session between the client (40) and the server (4), means to introduce a wait period during the negotiation between the client (40) and the server (4), means to establish, during the said wait period, a secure control channel with an autonomic agent (42) integrated in the client (40) to exchange between said optimization module (48) and the said autonomic agent (42) non-persistent security settings, means to apply between the autonomic agent (42) and the optimization module (48) a security procedure using the said non-persistent security settings, such that, during an exchange of streams between the information-producing user Pi and the information-consuming user Cj, the optimization module (48) having the non-persistent security settings appears as the client for the server during the said session, the system further comprising a coordination module that organizes a transfer of the optimization instructions between two separate optimization modules when the secure streams change route.

10. A computer program recorded on a processor readable non-transitory media, containing instructions to implement the method according to claim 1 when it is executed by computer.

* * * * *